UNITED STATES PATENT OFFICE.

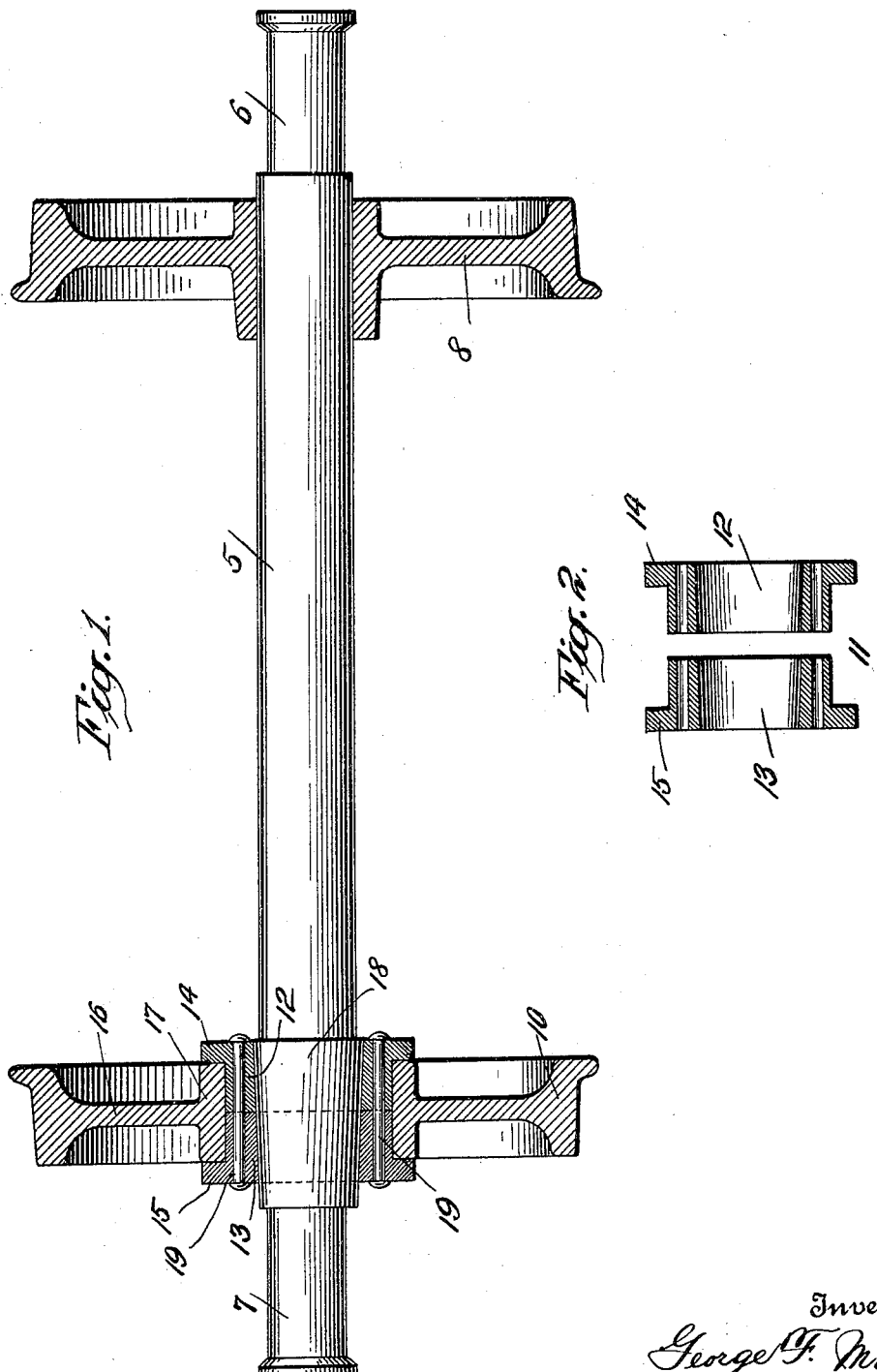

GEORGE F. MORGAN, OF NEW YORK, N. Y.

AXLE.

1,398,240.

Specification of Letters Patent.

Patented Nov. 29, 1921.

Application filed July 14, 1921. Serial No. 484,591.

*To all whom it may concern:*

Be it known that I, GEORGE F. MORGAN, a citizen of the United States, residing in New York city, in the county of New York and State of New York, have invented certain new and useful Improvements in Axles, of which the following is a specification.

The invention relates to an improvement in axles, and more particularly to an improvement in axles for railway cars and the like.

It has been proposed heretofore to provide the axles of railway cars and similar vehicles running upon rails with one loose and one fixed wheel. The reason for this arrangement of the wheels on the axle is that when the vehicle passes around a curve, the wheel on the outer track of the curve travels through a greater distance than the wheel on the inner track of the curve. Thus one wheel travels at a greater velocity than the other, and there necessarily results from this fact, especially if the vehicle is rounding a sharp curve, considerable friction and grinding, and consequent wear of both rails and the wheels, by reason of the slipping of one or both of the wheels. As axles provided with one loose and one fixed wheel have heretofore been constructed, they have been more or less unsatisfactory in operation. The object of the present invention is to produce an improved axle adapted for use on railway cars and other vehicles traveling on fixed rails. The invention consists in the novel manner of mounting the loose wheel upon the axle so as to secure greater efficiency in operation and so that the axle may be used for comparatively long periods without repair. The invention consists in the improved axle hereinafter described and particularly pointed out in the appended claims.

In the accompanying drawing illustrating the preferred form of the invention, Figure 1 is a longitudinal section through the improved axle with one loose and one fixed wheel mounted thereon; and Fig. 2 is a detail section of the collars upon which the loose wheel is mounted.

The improved railway car axle as illustrated in the drawing comprises an axle proper 5 provided at its opposite ends with the journal bearings 6 and 7. At one end of the axle is mounted the fixed wheel 8. These parts may be of any usual or preferred construction. To provide the axle with a loose wheel, provision must be made for the relatively great lateral thrusts to which the wheel is subjected in rounding a curve. Thrust surfaces must be provided such that there will be no lateral or axial movement of the loose wheel. At the same time provision must be made for ample bearing surfaces, and moreover the construction must be such that the loose wheel may be easily lubricated.

According to the present invention, the loose wheel 10 is mounted on a flanged collar generally indicated at 11 secured to the end of the axle opposite the fixed wheel 8. The collar 11 comprises the two end sections 12 and 13. The section 12 is provided with the flange 14 and section 13 is provided with the flange 15. The split or joint between the two sections 12 and 13 of the collar 11 is preferably located under the web 16 of the loose wheel, that is, substantially halfway of the bearing surface of the hub 17 of the loose wheel, as shown in Fig. 1. Thus when the collar and the loose wheel are mounted in position on the axle, ample bearing surface for the loose wheel is provided, and at the same time the relatively wide and high flanges 14 and 15 provide sufficiently strong thrust surfaces to withstand the lateral thrusts of the loose wheel when rounding a curve.

In assembling the loose wheel 10 and the split collar 11 on the axle, the sections 12 and 13 of the collar are first fitted to the loose wheel and then riveted together. In order that the collar may be securely fixed on the axle, the axle is provided with the tapered surface 18 and the collar is correspondingly tapered. The surface 18 tapers toward the end of the axle so that the collar with the loose wheel thereon may be pressed on and removed from the axle without disturbing the fixed wheel 8. If desired, the loose wheel and the sections of the collar may be assembled separately. In this case the section 12 is first pressed on the axle. The loose wheel is next mounted in place and then the section 13 of the collar is pressed on, after which the sections of the collar are riveted or bolted together. The sections 12 and 13 are of such size that when they are placed in position on the tapered surface 18 they can withstand lateral thrusts of the loose wheel without shifting. To mutually aid in holding each other in place on the axle, however, they are secured together by means of rivets or bolts 19. In case of repair, the loose wheel and its supporting collar may be removed either as a whole or in part, according to the necessity of the case.

Having thus described the invention, what I claim as new is:—

1. An axle for railway cars and the like having journal bearings and comprising a fixed wheel mounted at one end of the axle, a loose wheel mounted at the other end of the axle, and a collar for supporting the loose wheel consisting of two sections fixed on the axle and having their line of division substantially half way of the length of the bearing surface of the loose wheel.

2. An axle for railway cars and the like having journal bearings and comprising a fixed wheel mounted on one end of the axle, a loose wheel mounted at the other end of the axle, a collar for supporting the loose wheel fixed on the axle, said collar being in two sections and having flanges to prevent lateral movement of the loose wheel, the line of division between the two sections being substantially half way the length of the bearing surface of the loose wheel, and means for securing the sections together.

GEORGE F. MORGAN.